United States Patent
Koenig

[15] 3,646,681
[45] Mar. 7, 1972

[54] NAVIGATIONAL COMPUTER AND PLOTTING DEVICE

[72] Inventor: Francis L. Koenig, 6819 Elm Street, McLean, Va. 22101

[22] Filed: Dec. 31, 1969

[21] Appl. No.: 889,364

[52] U.S. Cl. ..............................33/1 SD, 33/72 R, 235/78
[51] Int. Cl. .........................................................G01c 1/02
[58] Field of Search .....................33/1 SD, 1 SB, 1 R, 72 R; 235/78, 88

[56] References Cited

UNITED STATES PATENTS

| 3,540,127 | 11/1970 | Kane | 33/1 SD |
| 2,114,652 | 4/1938 | Dalton | 33/1 SD |
| 2,407,893 | 9/1946 | Meyer | 33/1 SD |

FOREIGN PATENTS OR APPLICATIONS

| 50,370 | 1/1940 | France | 33/1 SD |
| 123,886 | 1/1949 | Sweden | 33/1 SD |

Primary Examiner—William D. Martin, Jr.
Attorney—Homer R. Montague

[57] ABSTRACT

A transparent-overlay combined navigational computer and plotting sheet usable directly upon any map, chart or the like, or, when secured to a rigid support panel, forming a pocket to receive such chart for portable or open-cockpit use; removably pivoted to the underside of the cover sheet are discs providing a compass rose protractor, a grid of distance lines and a series of parallel locating lines, a novel arrangement for magnetic deviation corrections with its reading auxiliaries, a series of azimuth locators, and axial graduations for vector diagram construction, all facilitating course, distance and location estimation and plotting, with allowances for compass variation and deviation error, current vector construction, and the solving of standard coastwise navigating problems and the like, together with protection of the chart against weather abuse, and windblown loss. A pelorus arm with sighting vanes, pivot, and hairline coinciding with the compass rose protractor is also provided.

4 Claims, 9 Drawing Figures

PATENTED MAR 7 1972 3,646,681

*INVENTOR*
Francis L. Koenig

BY *Homer R. Montague*
ATTORNEY

PATENTED MAR 7 1972

INVENTOR
Francis L. Koenig

BY Homer R. Montague
ATTORNEY

NAVIGATIONAL COMPUTER AND PLOTTING DEVICE

BACKGROUND OF THE INVENTION

Navigational chart holders and plotting boards known to the prior art have generally failed to meet all the requirements for maximum utility, particularly for open-cockpit or small-boat navigation, and especially in requiring reference to other charts, tables, apparatus and paper for such refinements as current vector calculations, compass error computations, and the like, or in necessitating the use of dividers, straightedges, triangles and the like which are a problem when a protected chart room is not available. Prior efforts to combine the chart holder with calculating instrumentalities have usually required the chart to be pierced by one or more pivots, making it most inconvenient to change charts, or to alter the folding pattern, as a voyage progresses.

SUMMARY OF THE INVENTION

The invention aims to provide in a single instrumentality, all of the features required for coastwise navigation, in an especially compact form suitable for use either in a chartroom or on any flat surface, or as combined with a chart holder in an open cockpit or small boat environment. The chart or the portion thereof in use is maintained fully visible, yet adequately protected from the wind and weather, and can be removed and changed with no difficulty. This is accomplished by inserting the chart in the pocket formed by a transparent markable cover sheet secured at several edges to a rigid support panel. To the underside of the cover sheet are pivoted a pair of transparent discs, in such a way that they can be removed (as required only for preparation of the vessel's deviation-computation curve), the pivot arrangement being very flat and making it unnecessary for an axle or the like to penetrate the chart itself for connection with any table surface, or with the rigid panel, or to protrude through the cover sheet to interfere with plotting. One of the discs includes a grid for distance measuring, replacing the conventional dividers, and a series of equidistant locater parallel lines in one direction, replacing the conventional parallel rule. This disc also has provisions for (a) the fiducial curves or reading markers for extracting magnetic deviation information from the deviation-correction curve through the use of dotted curves at the intersection of its major longitudinal axis with the inside circumference of the compass rose or protractor on the other disc, replacing the compass card, (b) locating the commonly used azimuths of 22½, 26½, 45, and 90° on either side of the course of the vessel in degrees magnetic bearing, replacing a protractor and straightedge, and (c) constructing a current vector, using only a pencil, the specifically graduated and marked longitudinal and cross axis of the instrument in conjunction with the parallels, and with the center hole of the pivot acting as the origin of point "A" of all diagrams, replacing graph paper, scale and protractor. On the second disc, a protractor or compass rose is plotted and it is on this disc that the novel circular or polar form of deviation-computation curve for the vessel involved is constructed.

The discs are readily rotated by having portions of their (preferably serrated) rims exposed at a cutaway margin of the cover sheet, and they are so arranged that, when set, they may easily be temporarily secured in place by double faced transparent "Scotch" tape applied between the surfaces of the discs and/or cover sheet. A pelorus allows the instrument to be used without a hand-held bearing compass, and aids in constructing the deviation-computation curve.

The arrangement for pivoting the discs above the chart is especially novel and advantageous, as it permits the user to remove the discs as needed for the individual plotting of the vessel's compass deviation curve yet does not interfere, when assembled, with free access of the chart to the pocket; and it is completely transparent, allowing full view of the entire chart area, and its almost imperceptible (0.005 inch) increase in thickness over the combined thickness of both rotors allows the transparent rotors and cover sheet to lay flat in contact with the chart for legibility, and further provides a flat surface on the cover sheet for drawing and plotting. The provision of a circular or polar form of deviation-computation curve, in combination with the compass rose of the device, and the novel curved reading auxiliaries on the grid disc or rotor, enables direct correction and uncorrection of the course for residual compass deviation, without the usually required reference to a compass card, deviation table or straight Napier diagram for each compass reading or change of course and without the necessity for remembering conversion formulas.

DESCRIPTION OF THE PREFERRED EMBODIMENT

Figure 1:
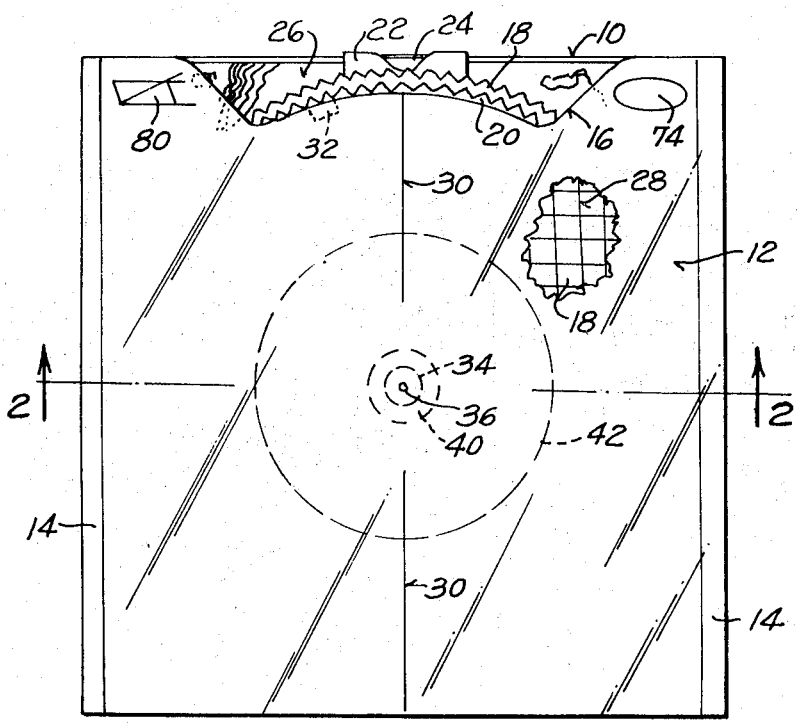
FIG. 1 is a plan view of the combined chart holder and plotting board, partly broken away to show underlying details.
Figure 2:
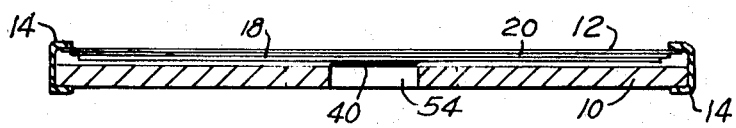
FIG. 2 is a sectional view taken on line 2—2 of the same.

FIGS. 1 and 2 show the preferred embodiment comprising the rigid supporting panel 10 of ⅛-inch "Masonite" or tempered hardboard or the like, conveniently about 18 inches square to accommodate a useful area of a standard navigational chart. The self-supporting cover sheet 12 may be formed of cellulose acetate or "Mylar" plastic or the like, having a thickness of about 0.010 inch and dimensions generally equal to those of board 10, secured at least along its side edges to the board as by adherent tape strips 14. The upper surface of sheet 12 is matte or grained, so that it can be marked by a pencil and erased when desired. An upper margin of the sheet 12 is cut away as at 16 to allow manual manipulation of the underlying discs 18 and 20, which are preferably provided with serrated edges for easy rotation. A plastic clip 22, with a segmental notch 24 in the top for readily contacting the rotor edge with the finger, is shown securing the chart 26 (between the board and the cover sheet) in place relative to a true line 30 scribed on the cover sheet. The chart is oriented, True North vertical, by aligning the vertical parallels 28 of the rotor 18 with the "True" line 30 on the cover sheet 12 and then aligning a convenient parallel of latitude or longitude on the chart with the rotor. The compass rose or protractor disc or rotor 20 is then rotated to the local variation of the chart in use, and secured in this position with double faced Scotch tape 32 between the under side of cover sheet 12 and the upper face of compass rose rotor 20.

Figure 3:
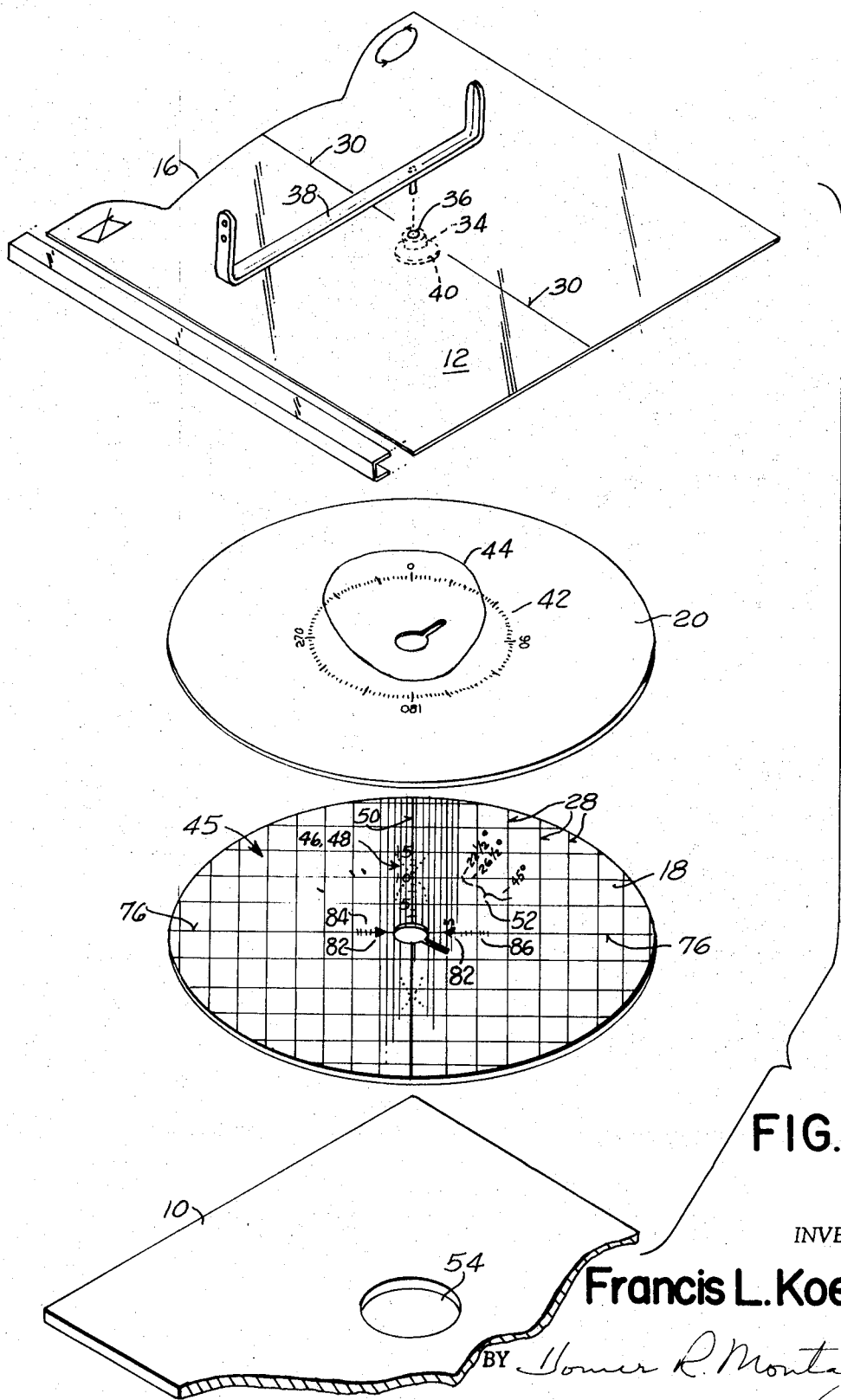
FIG. 3 is an exploded perspective view of the main components of the invention.

FIG. 3 shows these parts to better advantage, the cover sheet 12 being centrally perforated and carrying on its underside a very short transparent stub shaft 34 (having a central hole 36 to allow rotary mounting of a pelorus 38 above the sheet 12), whose lower end carries a thin, transparent retaining element 40 to be described below. The disc 20, next below the cover sheet, carries a standard compass rose circle 42, and a magnetic deviation correction curve 44. The next disc 18, also referred to as a rotor, is scribed or engraved or imprinted with a grid of mutually perpendicular lines forming distance scales 45 which can therefore be adjusted to agree with any direction of a course laid out for the craft. On at least one of the principal axial lines 50 of this grid, there is provided the pair of fiducial curves (46, 48), better shown in FIGS. 8 and 9, whose use and purpose will be described below.

This disc 18 is also imprinted with the parallel lines 28 on both sides of the major axial line 50 just described, to the outer limits of the disc, dimensionally related to the distance grid 45, allowing virtually any point on the chart to be aligned with any other point in any given direction, or allowing the laying off of a point or line at any selected distance on any selected bearing from any other point on the chart.

On this disc 18, on a radius coinciding with the compass rose of the other disc, are printed short radials 52 at 22½, 26½, and 45° (90° being self-evident as the cross axis). This is to facilitate finding the magnetic bearings "off the bow" of these commonly used azimuths, without arithmetic and the chance of resultant errors.

The main supporting board 10 is centrally apertured as at 54 so that, when no chart is in position in the pocket, the used has access to the retaining element 40 from below, to permit temporary removal of the disc 20 for application thereto of the deviation-computation curve 44, established for the vessel. This aperture also allows the chart to depress slightly in the center to compensate for the extra thickness of the retainer disc 40, resulting in a flat working surface of the cover sheet 12, even at the very center.

Figure 4:
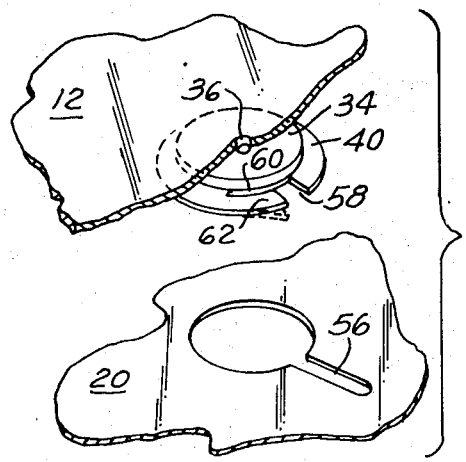
FIG. 4 is a fragmentary exploded perspective view of the parts associated with the novel pivot structure of the invention.

The way in which the discs 18 and 20 are secured to the underside of cover sheet 12 is best illustrated in FIG. 4, where numeral 34 and 40 again designate the transparent stub shaft and transparent disc retaining element, the shaft being cemented to the cover sheet and the retainer being cemented to the shaft. Taking disc 20 as an example, its central hole is sized to fit snugly about the short shaft 34, and a radial slot or slit 56 (about as long as the diameter of shaft 34) intersects this aperture. The retaining element 40 is simply a disc of flexible plastic cemented to the end of shaft 34, and having a radial gap 58 and a cutaway arcuate slit 60 intersecting this gap so that the resulting tang 62 can be deflected out of its normal plane by a suitable tool or pencil point, or even by an edge of the plastic disc 20 itself.

It will be obvious, from FIG. 4, that the disc 20 can be slipped into position on the shaft 39 by aligning the slit 56 with gap 58, deflecting the tang 62 into the slit, and rotating the disc clockwise (as seen in FIG. 4) while keeping the disc aperture approximately centered on the axis of the shaft 34, until the disc is wholly contained behind the retainer 40. Both discs are securely retained in this manner, and yet, since the short shaft is only a few thousandths of an inch longer than the combined thickness of the discs mounted on it, the thickness of the entire retaining arrangement is so slight that no interference is caused respecting the insertion of maps and charts within the pocket, or with the flatness of the working surface of the cover sheet. The transparency of the complete assemblage makes the entire underlying material visible by eliminating blind spots.

An important feature of the invention is the combination, with the compass rose on disc 20, of the improved circular or polar form of deviation-computation curve 44. The common Napier curve (see "American Practical Navigator," 1962, pages 166–169, U.S. Government Printing Office), is usually plotted on a well-known form of chart illustrated in FIG. 7 of the drawings, the centerline 64, 66 of each half of which corresponds to zero magnetic deviation. In use, the actual compass course is spotted as on the axis 64, and a line drawn, or visualized, (usually by interpolation) from that point to the curve 68 in a direction parallel to one set of the 30° inclination lines, and thence from curve 68 parallel to the other inclined lines, back to the axis 64, where the scale reading indicates the true magnetic course corresponding to the original compass course (or vice versa), corrected for the magnetic deviation (or error) of the craft's compass installation. The plethora of 30° diagonal lines on these charts tends to confuse the user, and there is no convenient way to avoid constant reference to this auxiliary chart. The invention permits nearly automatic deviation correction or uncorrection for any course whatever.

Curves 46 and 48 perform the same function as the 30° lines in a Napier diagram, and like them, form the equivalent of equilateral triangles. These curves, being movable along with disc 18 below the temporarily fixed deviation computation curve on disc 20, act much as a cursor on a slide rule, in conjunction with the deviation curve and the protractor circle, to recall the desired compass error information.

Figure 9:
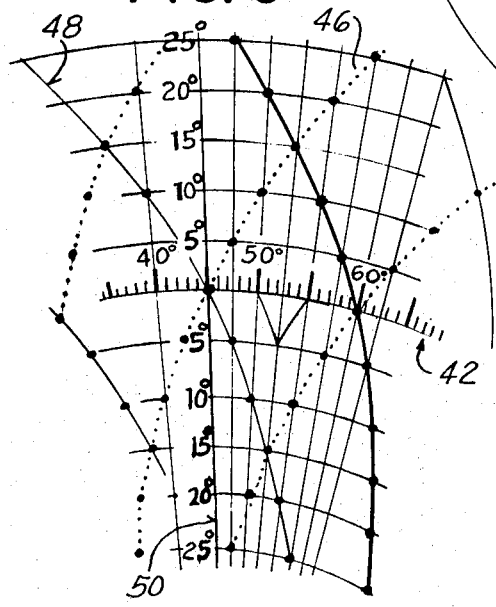
FIG. 9 is an enlarged view of a portion of FIG. 8 showing how the fiducial curves are constructed to function as sides of an equilateral triangle.

As can be seen in FIG. 9, the "altitude" along any radial (either inside or outside the base of the circle formed by the inner ends of the protractor graduations) to the point where it intersects a curve, is twice the length of the "base" measured along the protractor circle to its intersection with the same curve. In the examples of FIG. 9, given a 15° Easterly compass deviation at Magnetic 60°, follow the solid curve (red in the actual instrument) to the 15° circle outside the protractor, then follow the dotted (black) curve back to the protractor base line, and read 45°, the proper compass heading for a 60° magnetic bearing. Likewise, assuming a 5° Westerly deviation at 50° Magnetic, a line is drawn from 50° on the protractor, inside the protractor circle, parallel to the solid curve until it intersects the 5° circle. From this point, a line parallel to the dotted curve is drawn, back to the protractor base line, where 55°, the proper compass course, is read.

The above two examples are for "uncorrecting." For "correcting," or changing compass readings to Magnetic, this procedure is reversed. The magnitude of the deviation error is measured along radials at right angles to the base line (protractor circle) instead of along the 30° lines as in a Napier diagram.

Figure 7:
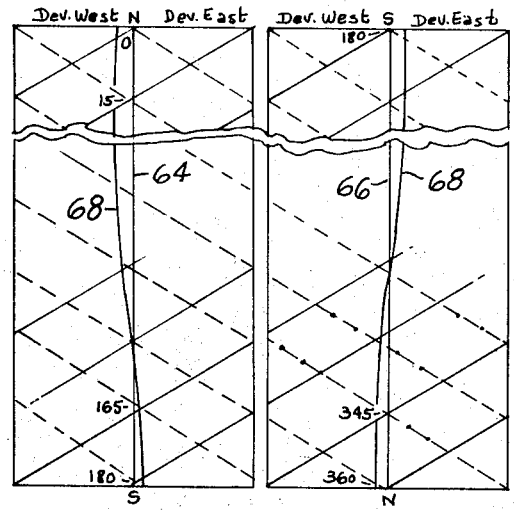
FIG. 7 is a drawing showing the usual presentation of the Napier diagram for computation of compass readings for the vessel's magnetic deviation, and a theoretical Napier line or curve plotted on the diagram.
Figure 8:
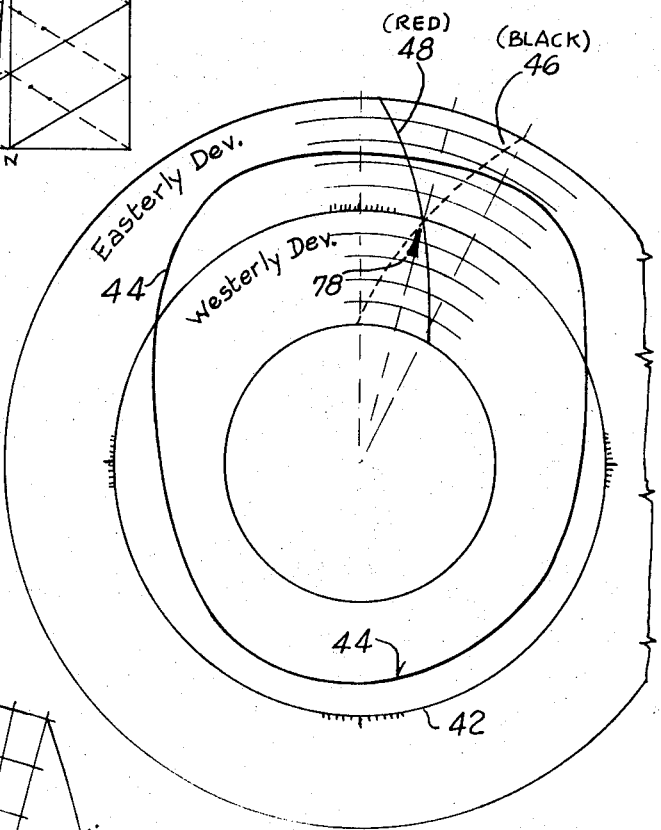
FIG. 8 is a plan view showing the theory of the improved deviation-computation curve and its relation to the Napier diagram in FIG. 7. This view shows the two straight diagrams connected and formed into a circle and shows by plotting how the 30° lines on the conventional straight diagram become curves. The same deviation error curve is plotted on this circle as in FIG. 7 to show its relationship and how it is used. The fiducial or reading curves are shown as seen through this disc on the adjoining rotor or disc 18.

To avoid the confusing multiplicity of "diagonal" arcs that would be needed if FIG. 7 were followed, the invention required only a single pair of such fiducial or reading arcs, these being scribed on the other disc 18, rotatable under the compass rose and the deviation-computation curve, thus providing an infinite number of direct readings from the compass rose to the deviation-computation curve and back to the compass rose, without interpolation and resultant possibility of error, yielding the appearance in the assembled device, as shown in FIG. 8, except that the construction lines are of course to be omitted.

The reading curves 46 and 48 are dotted in 1° intervals (the 5° marks being made larger) for original plotting of the deviation-computation curve, and later, for use in counting the amount of deviation at any bearing when such information is desired. Each curve should preferably be a separate color corresponding with the memonic diagram 74 on the cover sheet 12, to facilitate using the proper curves for "correcting" and "uncorrecting." Curve 48 (which in the actual instrument would be "red" or some other "color") is shown solid on this black-and-white patent drawing to distinguish it from curve 46 (shown dotted) which in the instrument would be black.

According to the invention, the vessel's compass deviation is first converted to a circular or polar form, as shown in FIG. 8. On the base line circle, which is conveniently the circle of the compass rose protractor 42 on disc 20, the deviations of the craft's compass are plotted in radial fashion, from the same data as in the plotting of the linear curve in FIG. 7, as from a vessel's deviation table if such exists, or by swinging the vessel throughout the circumference in a region where Magnetic North is known, or from a master compass whose error is known. Easterly deviations are plotted outside the compass rose base circle 42, westerly deviations inside.

The manner of constructing the improved deviation-computation curve 44 for the craft in question is of interest, and not obvious. Having first set the disc 20 for local variation and having available the compass-indicated headings versus Magnetic headings (obtained as in the preceding paragraph), the user plots these in polar form, using the solid curve 48 of the rotor 18 (set on the magnetic bearing) for scaling the magnitude and direction (East or West) of the deviation error, either inside the rose if Westerly, or outside the rose if Easterly, in the form of pencil dots on the cover sheet 12. These dots are then connected to form a smooth curve, in the usual way. The resulting curve is a deviation-computation curve, in polar form, of the vessel involved. The compass rose disc, 20, removed from the stub shaft 40, is aligned and centered over the cover sheet at the proper angle to allow for the local variation in magnetic north, and is taped temporarily in place, so that the underlying pencilled curve can be used as a guide in finally affixing the same curve on the disc 20. For permanence, the curve 44 is preferably applied to disc 20 by affixing a very narrow colored adhesive tape (e.g., 1/64 inch "Scotch" marking tape) from a standard dispenser and, to avoid distortion of the curve by normal tape shrinkage, the tape is severed after affixing at approximately 20° intervals, using a round pointed knife to avoid damaging disc 20. The disc, so marked, is then replaced on stub shaft 34 as above described, and the pencil marks on cover sheet 12 are erased.

Several of the curves corresponding to reading curves 46, 48 are shown in FIG. 9, but since the rotor 18 is freely rotatable on its axle pivot, only one single pair is actually needed. The extra ones are to indicate the complication of lines that would be involved if it were necessary to provide a whole set of such curves (as is true of the conventional 30° lines of the usual Napier diagram, FIG. 7). The resulting simplicity makes a very real contribution to ease of use of the correction curve 44, even in the hands of the relatively unsophisticated yachtsman or navigator. In actual construction, it is convenient to provide two sets of the reading curves 46, 48, 180° apart along line 50, as shown in FIG. 3, so that one set is always handy for use on the desired course. It will be understood, again, that the arcs shown in FIGS. 8 and 9, as centered on the rotor 18 pivot, are for construction and explanation purposes, and are not printed on the rotor (see FIG. 3). For greatest accuracy and ease of use, a pair of curves 46, 48 which intersect just at the base circle of the compass rose or protractor 42 are chosen to be printed on the rotor 18, although in theory, other pairs could be used from a mathematical standpoint.

To use the instrument for "uncorrecting" deviation error (that is, transposing from a magnetic bearing to a compass bearing), place the intersection-point of curve 46, 48 (which may be indicated by an arrowhead 78 on the rotor 18), on the desired magnetic heading (at the compass rose), and with a pencil mark on cover sheet 12 the intersection of the readout curve 48 with the deviation-computation curve 44. Then move disc 18 until the other of this pair of curves 46, intersects the mark just made at the deviation-computation curve 44, and read the corresponding compass course at arrow 78 (or the radial passing through the intersection of the curves 46, 48 if an arrowhead is not provided).

To "correct," or change from compass course to actual magnetic heading, set the arrow 78, or its radial direction line, to the compass course as read on the protractor 42. With pencil, mark the cover sheet at the intersection of the readout curve 46 with the deviation-computation curve 44, then move disc 18 until the other readout curve 48 intersects the mark just made, and read the required magnetic course at arrow 78, or its radial.

The center hole 36 of the cover sheet 12, and the calibrated longitudinal axis 50 and cross-axis 76 (on rotor 18) combine with the writing surface of the cover sheet to enable use of a rapid and unique method of constructing a standard current vector, with the corrected course being indicated by the longitudinal line through arrow 78 (or the radial through the arc intersection), against the compass rose or protractor 42 on disc 20.

Figure 5:
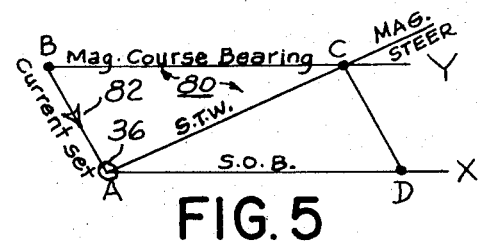
FIG. 5 is a detail of the mnemonic diagram for constructing a current vector diagram.
Figure 6:
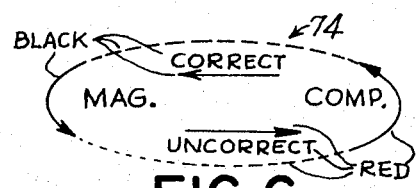
FIG. 6 is a detail of the mnemonic used in connection with the deviation computation feature.

Referring to FIG. 5, the mnemonic diagram 80 of FIG. 1, the method of correcting a magnetic course for current is as follows: From the chart, use the instrument to determine the desired course, and also the prevailing current direction, both in degrees magnetic. From current tables or other data determine the average current velocity to be expected during passage. Rotate the rotor 18 until cross-axis 76 matches the current "set" in degrees on the compass rose 42. From point "A," which is chosen as the center of the center hole 36 of the instrument, and using the black-numbered cross-axis scale half 76 with arrowhead 82, that indicates the current direction, set off with pencil on cover sheet 12 (in the opposite direction to the current), point "B," with the distance A-B equaling the current velocity in knots, using current scale calibration 84 of disc 18.

Now rotate the rotor 18 so that the longitudinal axis 50 indicates the desired magnetic course on the compass rose. With pencil, set off on cover sheet 12, along the longitudinal scale-half 86 of disc 18, colored (for distinctiveness) in the course direction, line A-X, and, using parallel lines 28 as a guide, also set off line B-Y, both lines being longer than the vessel speed as measured on scale 86. Next, move rotor 18 until the vessel speed through the water, (S. T. W.) using graduations 86, intersects line B-Y, as at "C." The corrected magnetic course will then appear at arrow 78 (or the corresponding radial) of axis 50 where it intersects the compass rose 42. This is then "uncorrected" for deviation error, by following the procedure previously described, to establish the desired compass course.

To determine speed-over-bottom (S. O. B.) in FIG. 5, the longitudinal axis 50 of rotor 18 is set at the current direction and, using the parallels 28 of this rotor as a guide, set off point D on A-X, C-D being parallel to the current direction. Using the most convenient graduated scale (either 84 or 86), distance A-D equals the vessel's speed-over-bottom.

To determine course made good, from a compass course, current direction and velocity known, the above obviously is reversed, compass course being first corrected for deviation to obtain magnetic, etc. All of these normally mysterious and complicated calculations are thus readily accomplished without mathematics of any kind, using only a pencil to solve the formulas graphically. This dispenses with the pair of triangles, protractor, scale, dividers, paper, and the arithmetic of adding and subtracting angles. The mnemonic vector diagram should be in two colors to match the colors of quadrant numbers and scale graduations, for ease of operation.

What is claimed is:

1. A combined navigational chart holder, course computer, compass variation and deviation reader, and plotting board, comprising a rigid support panel, a transparent cover sheet secured relative to said panel to form between them a chart-receiving pocket, a pivot stub secured to the under side of said cover sheet, a pair of perforated transparent disc rotors pivoted snugly about said pivot stub to overlie a chart held in said pocket, an element for removably retaining said rotors on said pivot stub, and cooperating indicia on said rotors to establish navigational parameters relative to such chart, said indicia including a polar curve of magnetic compass deviation on one of said rotors.

2. Apparatus in accordance with claim 1, in which said retaining element has a narrow radial gap, and said disc rotor has a short radial slit to permit removal and return of said rotor relative to said pivot stub.

3. Apparatus in accordance with claim 2, in which said support panel is perforated in the region of said pivot stub, to provide access for manipulation of said rotor discs onto and off of said pivot stub.

4. Apparatus in accordance with claim 1, in which said pivot stub and cover sheet are centrally apertured to form a socket for the pivot pin of a pelorus.

* * * * *